United States Patent [19]
Manian

[11] Patent Number: 5,296,341
[45] Date of Patent: Mar. 22, 1994

[54] GREEN LIGHT LASER IMAGING METHOD

[75] Inventor: Bala S. Manian, Saratoga, Calif.

[73] Assignee: Lumisys, Inc., Sunnyvale, Calif.

[21] Appl. No.: 908,575

[22] Filed: Jun. 24, 1992

Related U.S. Application Data

[63] Continuation of Ser. No. 665,416, Mar. 5, 1991, abandoned.

[51] Int. Cl.$^5$ ................................................. G03C 5/17
[52] U.S. Cl. .................................. 430/396; 430/945; 430/967; 250/484.2; 976/DIG. 439
[58] Field of Search ............... 430/363, 396, 494, 945, 430/966, 967; 250/484.1, 327.2; 976/DIG. 439

[56] References Cited

U.S. PATENT DOCUMENTS 4,770,978 9/1988 Matsuzaka .......................... 430/363

OTHER PUBLICATIONS

Sturge (ed.):*Neblett's Handbooks of Photography and Reprography*, 1977, p. 74.

*Primary Examiner*—Marion E. McCamish
*Assistant Examiner*—Kathleen Duda
*Attorney, Agent, or Firm*—Schneck & McHugh

[57] ABSTRACT

A method for digital imaging employing a green light laser. The method comprises obtaining a digitized picture image, modulating a green light laser beam in accord with the digitized picture image, and directing the modulated laser beam onto film that is sensitive to green-blue light. The film is then developed to create a gray-scale image useful in radiography and other imaging fields.

8 Claims, No Drawings

GREEN LIGHT LASER IMAGING METHOD

This is a continuation of copending application Ser. No. 07/665,416 filed on Mar. 5, 1991, now abandoned.

TECHNICAL FIELD

The present invention relates to laser imaging methods and particularly to digital imaging.

BACKGROUND ART

Increasing acceptance of teleradiology, i.e. facsimile transmission of medical image information, and of digital archival storage of medical information as an alternative to film libraries has put great demand on means to first accurately convert information on x-ray film to a digital representation, and then to convert the digital information back to an image on x-ray film after storage or transmission. It is important not only to maintain accurately the information content between the original and the reproduced copy, but also to match exactly the visual appearance between the two. In actual use, laser film digitizers scan the x-ray film and convert image information into a digital representation of the actual density on the film. On the output side, laser film recorders are used to convert digital representations of density into image information on x-ray films.

Present laser film recorders use either red light from a He-Ne laser or infrared light from a diode laser for its scanning spot. Hence the films used to record the images on these laser film recorders have to be either red light sensitive or infrared light sensitive, depending upon the particular laser film recorder selected. The typical x-ray film used in radiology today all have blue or green sensitivity. Because of this, it is difficult to scan a conventional x-ray film and then reproduce it on a laser film recorder, matching its hue and color with the original film.

The differences in these two types of film, red sensitive and conventional black and clear mean that radiologists must learn to read and interpret images on the two films. This is not only burdensome, but the potential exists for misreadings of digital x-ray images. This is because the nature of reading radiographs is more like a skill that is developed with experience than something that can be taught. Therefore a radiologist experienced with conventional black and clear x-ray film may at first miss some of the subtle differences with red sensitive film.

Hospitals commonly have both conventional x-ray screen-film systems and digital radiography systems, thus familiarity with both systems is needed. It is important to note that there are other differences between conventional and digital radiography systems. For example, because the film used in the digital radiography system is sensitive to red light, it must be developed in total darkness. Standard black and clear x-ray film, on the other hand, is not sensitive to red light, and therefore a red light safety light may be used in the darkroom.

Laser scanning is also known in color film imaging. In U.S. Pat. No. 4,770,978 Matsuzaka discloses a method of producing a photographic image by scanning three separate laser beams, blue, green and red, onto a silver halide color photosensitive material having a blue-sensitive emulsion layer, a green-sensitive emulsion layer and a red-sensitive emulsion layer.

Therefore, in view of the above, it is an object of the present invention to devise a method for digital imaging which is more consistent with prior imaging methods and is more convenient than prior methods.

SUMMARY OF THE INVENTION

The above objects have been achieved by a method for laser imaging which allows for using the same developing process as used for conventional black and clear film. This is accomplished by an imaging method that uses a green light laser beam and green-blue sensitive film to reconstruct a digital stored or transmitted image. Therefore, in the field of radiology, conventional black and clear single emulsion x-ray film may be used in this method, since it is sensitive to green-blue light.

The imaging method involves taking digitized picture image signals and using them to modulate a green light laser beam. The modulated beam is then directed onto and scanned across film that is sensitive to green-blue light. Development of this film produces a gray-scale image with the same appearance as an image produced in a conventional manner using black and white film.

Advantages of this method for radiography in particular are that the recreated digital image is very similar in appearance to standard black and clear x-rays with which radiologists are most familiar. In fact, because of digital processing, the image may be superior to those of the conventional screen-film systems. Because the image has color and hue that are more familiar to radiologists, it is expected that fewer misreadings of digital radiographs will occur.

Another advantage of the present imaging method is that the cost of film is reduced since standard black and clear x-ray film is less expensive than the special red or infrared sensitive laser film now used in digital radiography systems. Moreover, only one developing system would be needed for both conventional films and digital films, and the need for a total darkroom would be eliminated.

BEST MODE FOR CARRYING OUT THE INVENTION

The novel method for laser imaging comprises the following steps: a) obtaining a digitized picture image; b) modulating a green light laser beam in accord with the digitized picture image; and c) directing the modulated beam onto film sensitive to green-blue light.

It is not critical how the digitized picture image is obtained, so long as it accurately produces the original image. To this end, the method of imaging continues by modulating a green light laser beam in accord with the digitized picture image. The modulated laser beam is then scanned across a film that is sensitive to green-blue light, so that a gray-scale image is produced on the film.

The green light laser beam may be produced by a new and inexpensive green light helium-neon laser. Alternatively, a frequency doubled diode laser can be used to produce a green light beam. Frequency doubling is accomplished by using harmonic generators which are typically made from nonlinear lasant material designed to resonate at and emit the second mode of the light beam. This doubles the frequency of the beam at the expense of lower power.

Using a green light laser beam would permit existing single emulsion duplication films to be used in laser imagers resulting in very similar image characteristics. This is important to radiologists, since the two films, conventional x-ray film and digital film, would look exactly the same. Advantages of using green-blue sensitive film are that the film costs less than red sensitive film and no special darkroom conditions are necessary for development.

Adapting the imaging method specifically to digital radiography would comprise the following steps: a) irradiating a subject to x-ray radiation, b) collecting a set of x-ray energy signals for the irradiated subject, c) digitizing the set of x-ray energy signals into digital data, d) storing and processing the digital data, e) modulating a green light laser beam in accord with the stored and processed digital data, f) directing the modulated green light laser beam onto film sensitive to green-blue light thereby producing a latent image in the film, and g) thereafter developing the film to create a gray-scale image.

Irradiating a subject, e.g., a sample of tissue or body part, with x-rays produces an energy pattern because of differences in the absorption and diffusion of the x-rays caused by the various internal surfaces and tissue types of the subject. The step of collecting a set of x-ray energy signals, which make up the energy pattern, may be carried out by a video camera or image plate as previously described. Generally these energy signals will be analog and will need to be converted to digital data. Once the data is digitized it may then be digitally processed and stored in computer memory or on a mass storage device associated with the computer.

The stored digital data may then be used to modulate the laser beam in a digital recorder, but first the digital data generally needs to be converted back into analog signals. With the present method the laser beam is in the green light spectrum. This allows for using conventional black and clear film which is sensitive to green-blue light. To produce a latent image in the film the modulated laser beam is scanned across the film. Development of the film creates a gray-scale image with the same color and hue as conventional screen-film.

Changing an existing imaging system over to the laser imaging method described above, may be done at little expense, since green helium-neon lasers may be designed to be plug compatible with existing laser imagers. Thus, there would be little capital cost in employing this imaging method with existing imaging systems and thereby attaining the advantages noted above. It is also noted that this imaging method has application in fields where gray-scale images and computer storage are desired.

I claim:

1. A method of laser imaging comprising the steps of,
   recording on X-ray film a gray-scale picture image corresponding to an X-ray irradiated subject,
   digitizing the recorded picture image by means of a film digitizer,
   modulating a single laser beam of green light wavelength in accordance with the digitized picture image,
   directing the modulated laser beam of green light wavelength onto film sensitive to green-blue light, and
   thereafter developing the film to create a gray-scale re-recorded image, whereby the re-recorded image has optical characteristics to the human eye matching those of the picture image on the conventional black and clear X-ray film.

2. The method of claim 1 wherein said laser beam of green light wavelength is produced by a helium-neon laser.

3. The method of claim 1 wherein said laser beam of green light wavelength is produced by a frequency double diode laser.

4. A method of digital imaging using a laser comprising the steps of,
   obtaining signals representing a digitized picture image corresponding to an X-ray irradiated subject,
   providing a single laser beam of green light wavelength,
   modulating the laser of green light wavelength beam in accordance with the signals representing the digitized picture image,
   directing the modulated laser beam onto film sensitive to the green-blue light, thereby producing a latent image in the film, and
   thereafter developing the film to create a gray-scale image.

5. A method of digital imaging using a laser comprising the steps of,
   obtaining signals representing a digitized picture image corresponding to an X-ray irradiated subject,
   doubling the frequency of a single laser beam of a diode laser to produce a beam of green light wavelength,
   modulating the doubled laser beam in accordance with the signals representing the digitized picture image,
   directing the modulated laser beam onto film sensitive to green-blue light, thereby producing a latent image in the film, and
   thereafter developing the film to create a gray-scale image.

6. A method of digital radiography using a laser beam comprising the steps of,
   irradiating a subject with X-ray radiation,
   collecting a set of X-ray energy signals from the irradiated subject,
   digitizing the set of X-ray energy signals into digital data signals,
   storing and processing the digital data signals,
   modulating a single laser beam of green light wavelength in accordance with the stored and processed digital data signals,
   directing the modulated laser of a green light wavelength beam onto film sensitive to green-blue light thereby producing a latent image in the film, and
   thereafter developing the film to create a gray-scale image.

7. The method of claim 6 wherein said laser beam of green light wavelength is produced by a helium-neon laser.

8. The method of claim 6 wherein said laser beam of green light wavelength is produced by a frequency doubled diode laser.

* * * * *